United States Patent
Kuo et al.

(10) Patent No.: US 7,508,237 B2
(45) Date of Patent: Mar. 24, 2009

(54) MAINBOARD, ELECTRONIC COMPONENT, AND CONTROLLING METHOD OF LOGIC OPERATION

(75) Inventors: Hung Yi Kuo, Shindian (TW); Jenny Chen, Shindian (TW); Huei-Lin Chou, Shindian (TW)

(73) Assignee: VIA Technologies, Inc., Shindian, Taipei (TW)

( * ) Notice: Subject to any disclaimer, the term of this patent is extended or adjusted under 35 U.S.C. 154(b) by 754 days.

(21) Appl. No.: 11/094,282

(22) Filed: Mar. 31, 2005

(65) Prior Publication Data

US 2006/0126402 A1    Jun. 15, 2006

(30) Foreign Application Priority Data

Dec. 10, 2004    (TW)    ............... 93138477 A

(51) Int. Cl.
   *H03K 19/00*    (2006.01)
(52) U.S. Cl. .......................................... 326/93; 326/26
(58) Field of Classification Search ............. 326/26–28, 326/93–94
See application file for complete search history.

(56) References Cited

U.S. PATENT DOCUMENTS

| | | | | |
|---|---|---|---|---|
| 6,526,106 | B1 * | 2/2003 | Migita | ........................ 375/354 |
| 7,239,300 | B2 * | 7/2007 | Shimizu | ..................... 345/100 |
| 7,259,594 | B2 * | 8/2007 | Peeters et al. | ................. 326/93 |

FOREIGN PATENT DOCUMENTS

TW    477950    3/2002

* cited by examiner

*Primary Examiner*—James H Cho
(74) *Attorney, Agent, or Firm*—Birch, Stewart, Kolasch & Birch, LLP

(57) ABSTRACT

A controlling method of logic operations is used to control a plurality of logics inside a chip, which is in a power peak state. The controlling method comprises the following steps of: providing a control signal to the chip, controlling at least one of the logics based on the control signal at a first timing, and controlling at least another one of the logics based on the control signal at a second timing. The control signal is intent to substantially control actions of the logics synchronously. Moreover, a mainboard and an electronic component, utilizing the controlling method of logic operations, are provided.

19 Claims, 6 Drawing Sheets

MAINBOARD, ELECTRONIC COMPONENT, AND CONTROLLING METHOD OF LOGIC OPERATION

BACKGROUND OF THE INVENTION

1. Field of Invention

The invention relates to a mainboard, an electronic component, and a controlling method of logic operations. In particular, the invention pertains to a mainboard, an electronic component, and a controlling method of logic operations for starting a plurality of logics in different regions separately.

2. Related Art

With the technological advances, there are different types of electronic information devices (e.g. computers, cell phones, web servers, etc) that require different chips for normal operations. How to ensure the correct functioning of a chip thus becomes an important topic in the development of modern information technology.

Generally speaking, all chips are installed on circuit boards (e.g. printed circuit boards) in hardware. Each of the chips has a plurality of logics. A distinct bias may be required to initiate each logic. When different bias voltages are provided to the chip and they all satisfy the standard, the system will generate a start signal to the chip. Inside the chip, the logics are initialized according to the start signal. The plurality of logics in the chip will function synchronously. Therefore, the chip is in a power peak state, with an abrupt rise in the power consumption. The noise signals induced according to the Lenz law are dispersed to the pins between the power source and the ground. Therefore, the voltage level has an instantaneous change that may eventually result in erroneous functioning of the chip.

For example, the mainboard of a computer usually has a south bridge chip whose inside has a plurality of digital logics requiring a voltage level of at least 3.3 V and 2.5 V. Therefore, the main board is configured with at least two different power lines (one for 3.3 V and the other for 2.5 V) connecting to the south bridge. They provide different voltage levels for the south bridge to function correctly. When the power of 3.3 V and 2.5 V levels is provided to the chip, the computer system generates an enable signal to initiate the digital logics inside the south bridge. When the digital logics operate simultaneously, a large noise will be generated at this moment, resulting in abnormal operations of the south bridge.

Therefore, this invention provides a mainboard, an electronic component and controlling method of logic operations that can reduce the noises caused by the logics, which operate synchronously.

SUMMARY OF THE INVENTION

In view of the foregoing, the invention is to provide a mainboard, an electronic component, and a controlling method of logic operations for starting a plurality of logics in different regions separately.

To achieve the above, a mainboard of the invention comprises a chip and several control units. The chip has a plurality of logics. The control units are electrically coupled to the chip. At a first timing, the control units control at least one of the logics according to a control signal. At a second timing, the control units control at least another one of the logics according to a control signal.

In addition, the invention discloses an electronic component having different parts to start operating separately. The electronic component comprises a plurality of logics and a control unit. The control unit is electrically coupled to the logics. The control unit controls at least one of the logics based on a control signal at a first timing and at least another one of the logics based on the control signal at a second timing.

The invention also discloses a controlling method of logic operations, which is for controlling a plurality of logics inside a chip that is in a power peak state. The controlling method comprising the following steps of: providing a control signal to the chip, wherein the control signal substantially controls actions of the logics synchronously; controlling at least one of the logics based on the control signal at a first timing; and controlling at least another one of the logics based on the control signal at a second timing.

As mentioned above, the mainboard, electronic component and controlling method of the invention use several control units to let the logics start operating separately at different times. Therefore, the logics can be prevented from starting simultaneously when the chip is in a power peak state. This can lower the noises caused by simultaneously starting several logics and ensure the normal operation of the chip.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
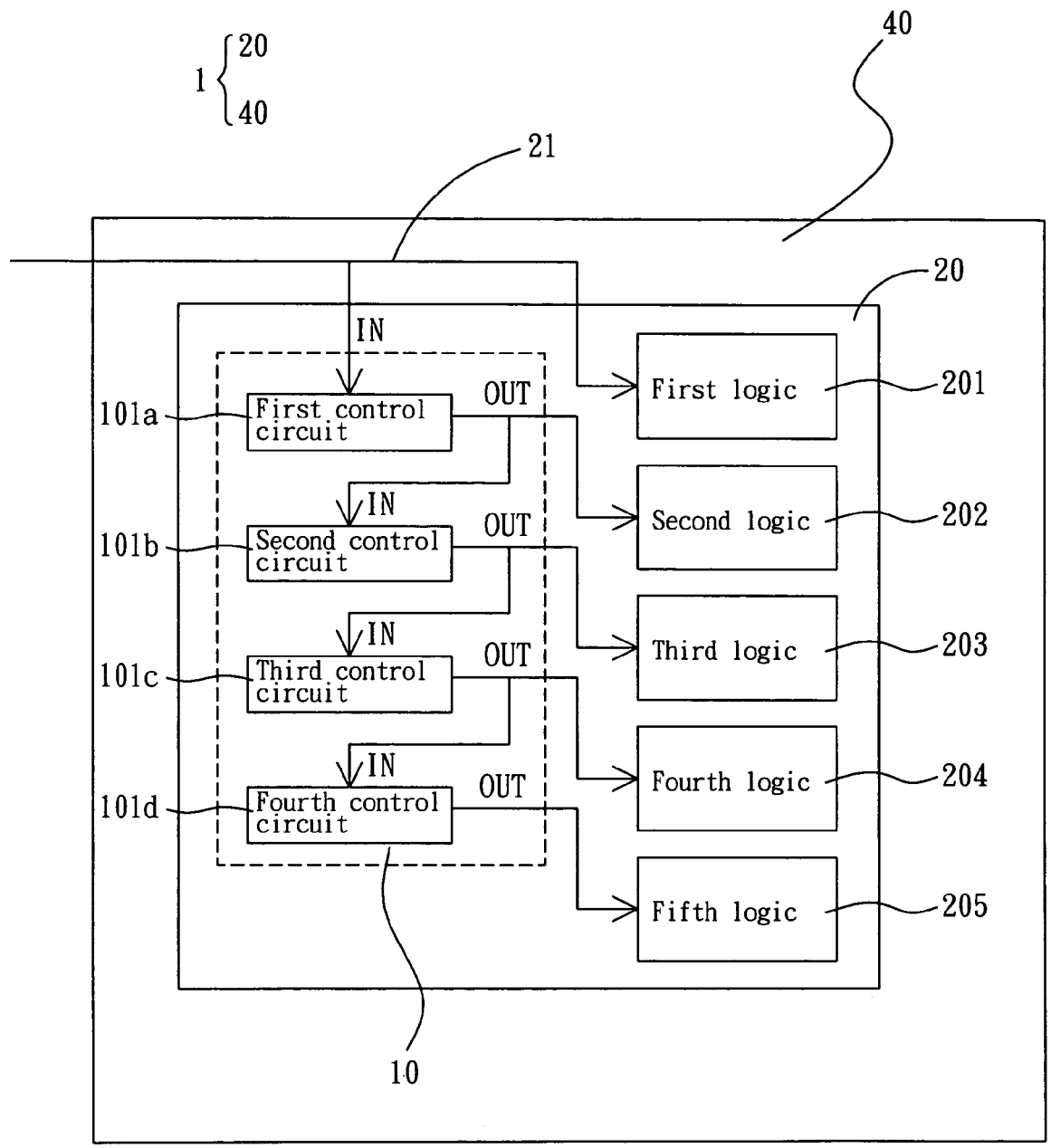
FIG. 1 is a block diagram of an electronic component according to a preferred embodiment of the invention.

FIG. 1 shows a block diagram of the electronic component 20 according to a preferred embodiment of the invention. The electronic component 20 is installed on a circuit board 40 having at least one signal line 21 and several power lines (not shown). In the preferred embodiment, the electronic component 20 and the circuit board 40 construct a mainboard 1 of, for example, a computer. The electronic component 20 contains a control unit 10 and several logics. To be specific in the illustration, we assume the number of logics here is 5, respectively, a first logic 201, a second logic 202, a third logic 203, a fourth logic 204, and a fifth logic 205. The primary purposes of these logics are to perform numerical operations and data processing. The logics 201, 202, 203, 204, 205 have respectively an enable pin to input a control signal, which can be an enable signal for initialization of an operation or a disable signal for terminating an operation. The control signal substantially controls the action of all logics synchronously. In this embodiment, the control signal is an enable signal for the illustration purposes only. The power lines can be a power layout of the circuit board 40 and are electrically coupled to the logics 201, 202, 203, 204, 205 inside the electronic component 20 to provide the necessary power for Them. When the bias voltage required by the electronic component 20 is transmitted via the power lines into the electronic component 20, the signal line 21 provides a control signal to the control unit 10. The control unit 10 then starts the logics 201, 202, 203, 204, 205 separately based on the control signal. The logics 201, 202, 203, 204, 205 thus start operations. At this moment, the chip is in a power peak state.

In this embodiment, the control unit 10 has several control circuits 101a, 101b, 101c, 101d. Each of the control circuits 101a, 101b, 101c, 101d is electrically coupled to the logics 202, 203, 204, 205. At different times, each of the control circuits 101a, 101b, 101c, 101d provides a control signal to the corresponding logic 202, 203, 204, 205 to control it. In the preferred embodiment, the control circuits 101a, 101b, 101c, or 101d is a delay circuit with one input terminal IN and one output terminal OUT. When a control signal enters the control circuits 101a, 101b, 101c, or 101d via the input terminal IN, it is output via the output terminal OUT after a certain time of delay (which is set by the user according to practical needs).

To be specific, we assume there are four control circuits in the control unit 10. They are, respectively, a first control circuit 101a, a second control circuit 101b, a third control circuit 101c, and a fourth control circuit 101d. In particular, the enable pin of the first logic 201 is coupled to the signal line 21. The enable pin of the second logic 202 is coupled to the output terminal OUT of the first control circuit 101a. The enable pin of the third logic 203 is coupled to the output terminal of the second control circuit 101b. The enable pin of the fourth logic 204 is coupled to the output terminal OUT of the third control circuit 101c. The enable pin of the fifth logic 205 is coupled to the output terminal OUT of the fourth control circuit 101d. Moreover, the input terminal IN of the first control circuit 101a is coupled to the signal line 21. The input terminal IN of the second control circuit 101b is coupled to the output terminal OUT of the first control circuit. The input terminal IN of the third control circuit 101c is coupled to the output terminal OUT of the second control circuit 101b. The input terminal IN of the fourth control circuit 110d is coupled to the output terminal OUT of the third control circuit 101.

Figure 2:
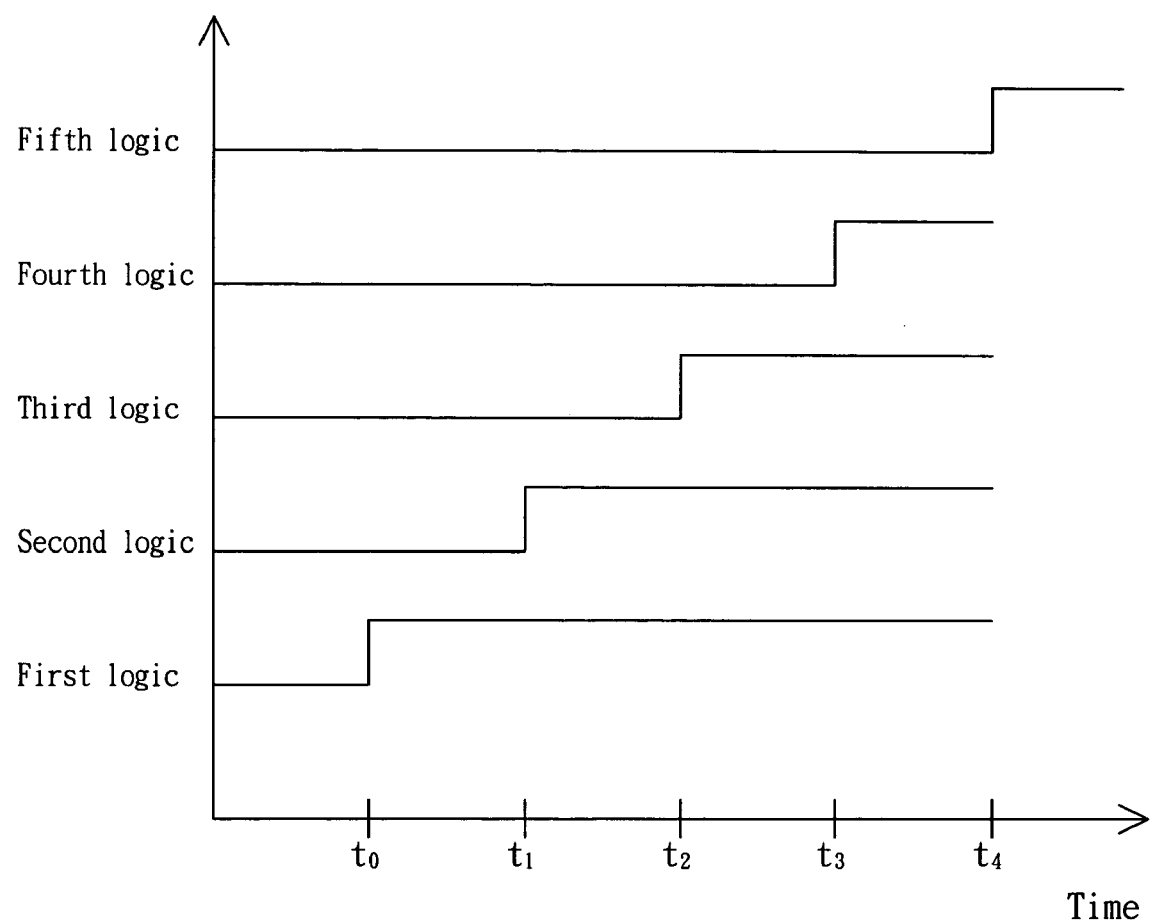
FIG. 2 is a timing chart showing the time-ordered signal variation at the enable pin of each logic in FIG. 1.

Please refer to FIG. 2, which is a timing chart showing the time-ordered signal variation at the enable pin of each logic in FIG. 1. Here we assume that the signal at the enable pin of the logic is a high level for starting an operation. The disclosed mainboard 1 operates as follows. First, when the bias voltage required by the electronic component 20 is transmitted via the power line to the electronic component 20, a control signal (high voltage level) is provided to the first logic 201 and the input terminal of the first control circuit 101a at time to by the signal line 21. The first logic 201 starts functioning after receiving the control signal. The output terminal OUT of the first control circuit provides the control signal to the second logic 202 and the input terminal IN of the second control circuit 101b after one unit of time. Therefore, the second logic 202 starts functioning at time $t_1$. At time $t_2$, the output terminal OUT of the second control circuit 101b provides the control signal to the third logic 203 and the input terminal IN of the third control circuit 101c after two units of time. Therefore, at time $t_2$, the third logic 203 starts functioning. At time $t_3$, the output terminal OUT of the third control circuit 101c provides the control signal to the fourth logic 204 and the input terminal IN of the fourth control circuit 101d after four units of time. Therefore, at time $t_3$, the fourth logic 204 starts functioning. At time $t_4$, the output terminal OUT of the fourth control circuit 101d provides the control signal to the fifth logic 205 after five units of time, and the fifth logic 205 starts functioning.

Figure 3:
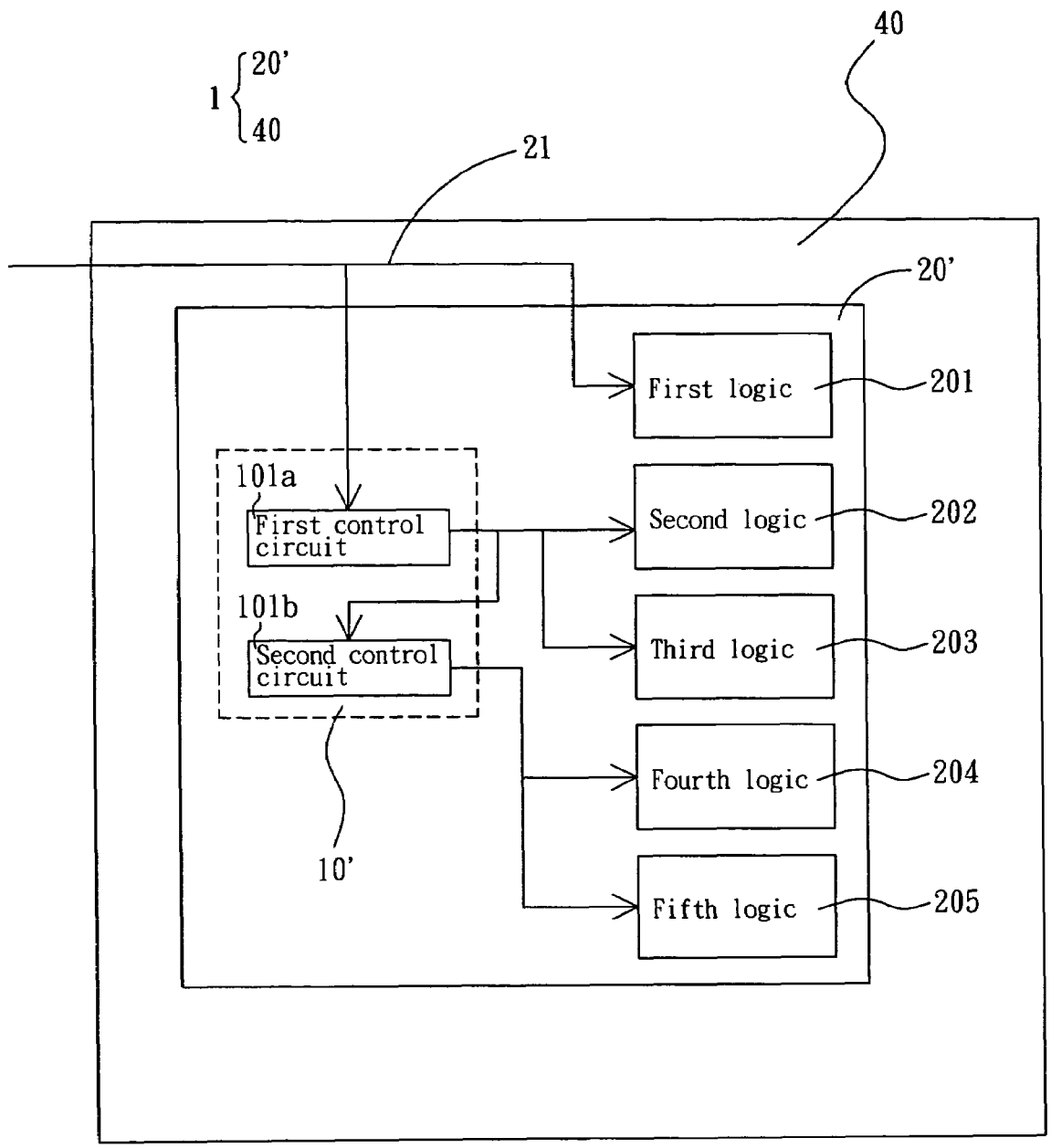
FIG. 3 is a block diagram of an electronic component according to another embodiment of the invention.

Besides, although the control circuits and logics shown in FIG. 1 have a one-to-one correspondence, the invention is not limited to this kind of configurations. For example, they can have a one-to-many correspondence. FIG. 3 shows the block diagram of another embodiment, where the same references relate to the same elements in FIG. 1. Here the mainboard 1 contains an electronic component 20' and a circuit board 40, where the circuit board 40 contains a signal line 21 and several power lines (not shown). There are several logics 201, 202, 203, 204, 205 inside the electronic component 20'. Here we assume that there are five logics, including a first logic 201, a second logic 202, a third logic 203, a fourth logic 204 and a fifth logic 205. The number of control circuits in the control unit is assumed to be 2: respectively the first control circuit 101a and the second control circuit 101b. The enable pin of the first logic 201 is coupled to the signal line 21. The enable pins of the second and third logics 202, 203 are coupled to the output terminal OUT of the first control circuit 101a. The enable pins of the fourth logic 204 and the fifth logic 205 are coupled to the output terminal OUT of the second control circuit 101b.

Figure 4:
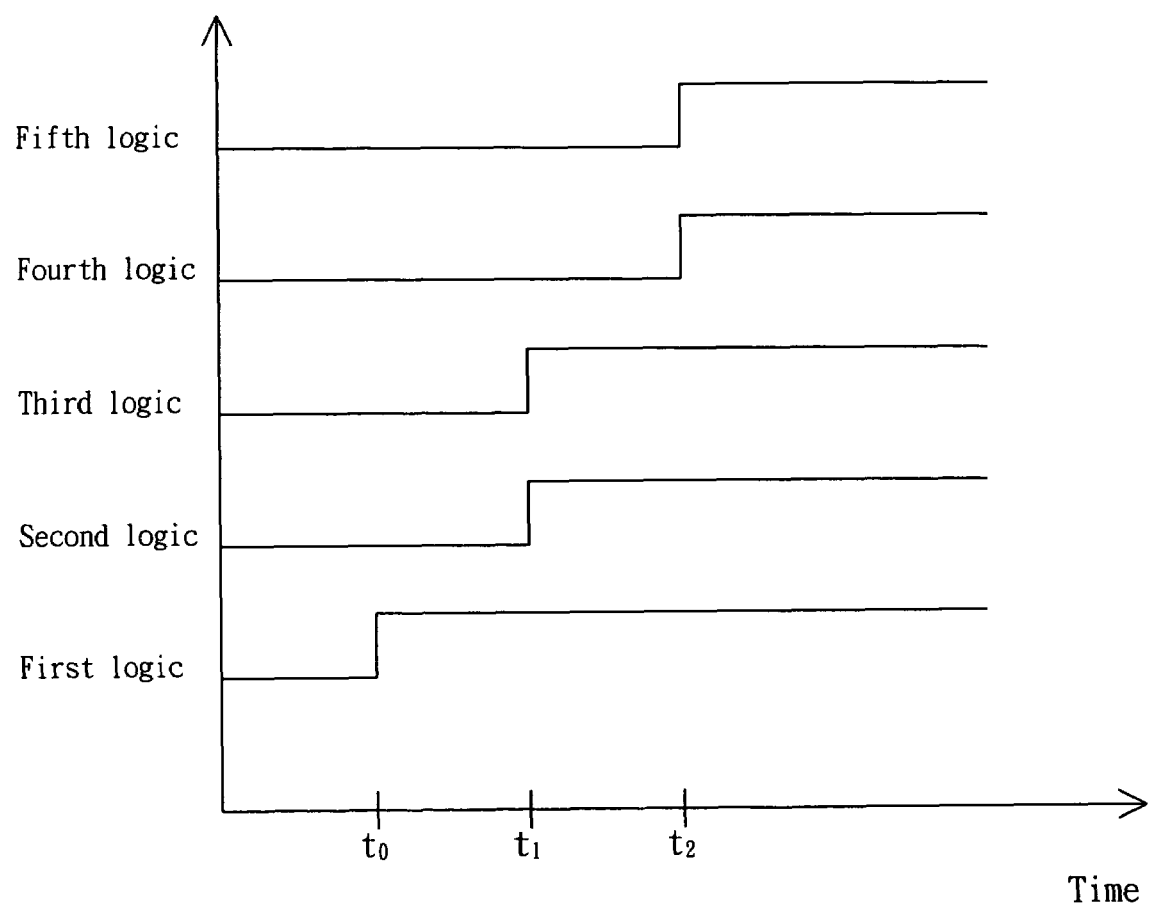
FIG. 4 is a timing chart showing the time-ordered signal variation at the enable pin of each logic in FIG. 3.
Figure 5:
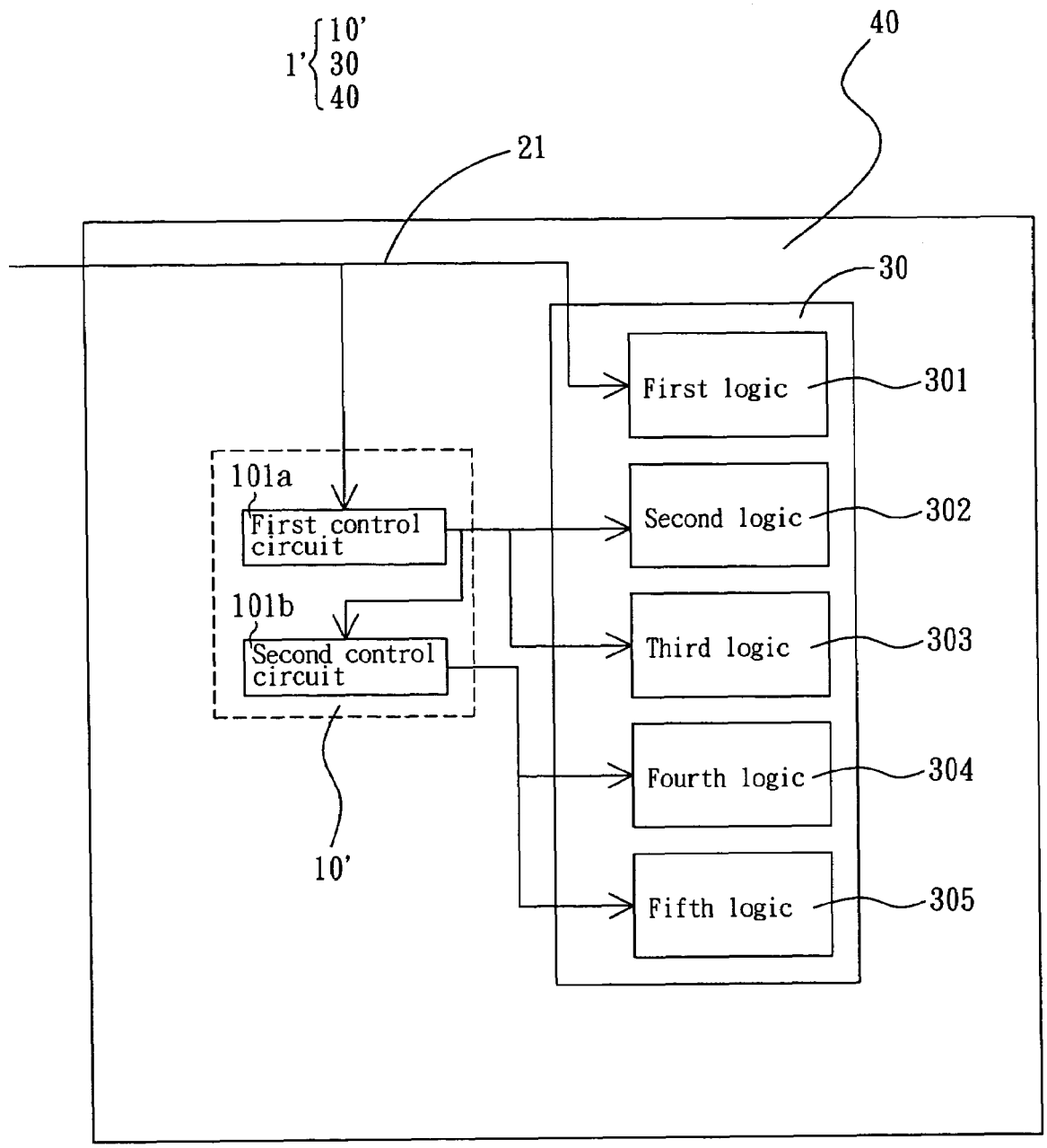
FIG. 5 is a block diagram of a mainboard according to an embodiment of the invention.

With reference to FIG. 4 that is a timing chart showing the time-ordered signal variation at the enable pin of each logic in FIG. 3, when the bias voltage required by the electronic component 20' is provided via the power lines, a control signal (high voltage level) is provided by the signal line 21 at time $t_0$ to the first logic 201 and the input terminal IN of the first control circuit 101a. The first logic 201 starts functioning after receiving the control signal. The output terminal OUT of the first control circuit 101a provides the control signal to the second logic 202, the third logic 203, and the input terminal of the second control circuit 101b after one unit of time. Therefore, the second logic 202 and the third logic 203 start functioning at time $t_1$. After two units of time, the output terminal OUT of the second control circuit 101b provides the control signal to the fourth logic 204 and the fifth logic 205 at time $t_2$. Therefore, the fourth logic 204 and the fifth logic 205 start functioning at time $t_2$. The net result is that the logics 201, 202, 203, 204, 205 start separately to avoid simultaneous start at one time. As shown in FIG. 5, the control unit 10' can be independent of the electronic component 20 (as shown in FIG. 3), but operates with a conventional chip 30 (e.g. a conventional south bridge or north bridge). It is further electrically coupled to the enable pins of the logics 301~305 inside the chip 30 through the circuit layout of the circuit board 40. Thus, the logics 301~305 inside the chip 30 operate separately. In this case, the control unit 10', the chip 30, and the circuit board 40 constitute the mainboard 1' according to another embodiment of the invention. The features and configurations of all elements in this embodiment are the same as those of the previous embodiment, so the detailed descriptions are omitted for concise purpose.

Figure 6:
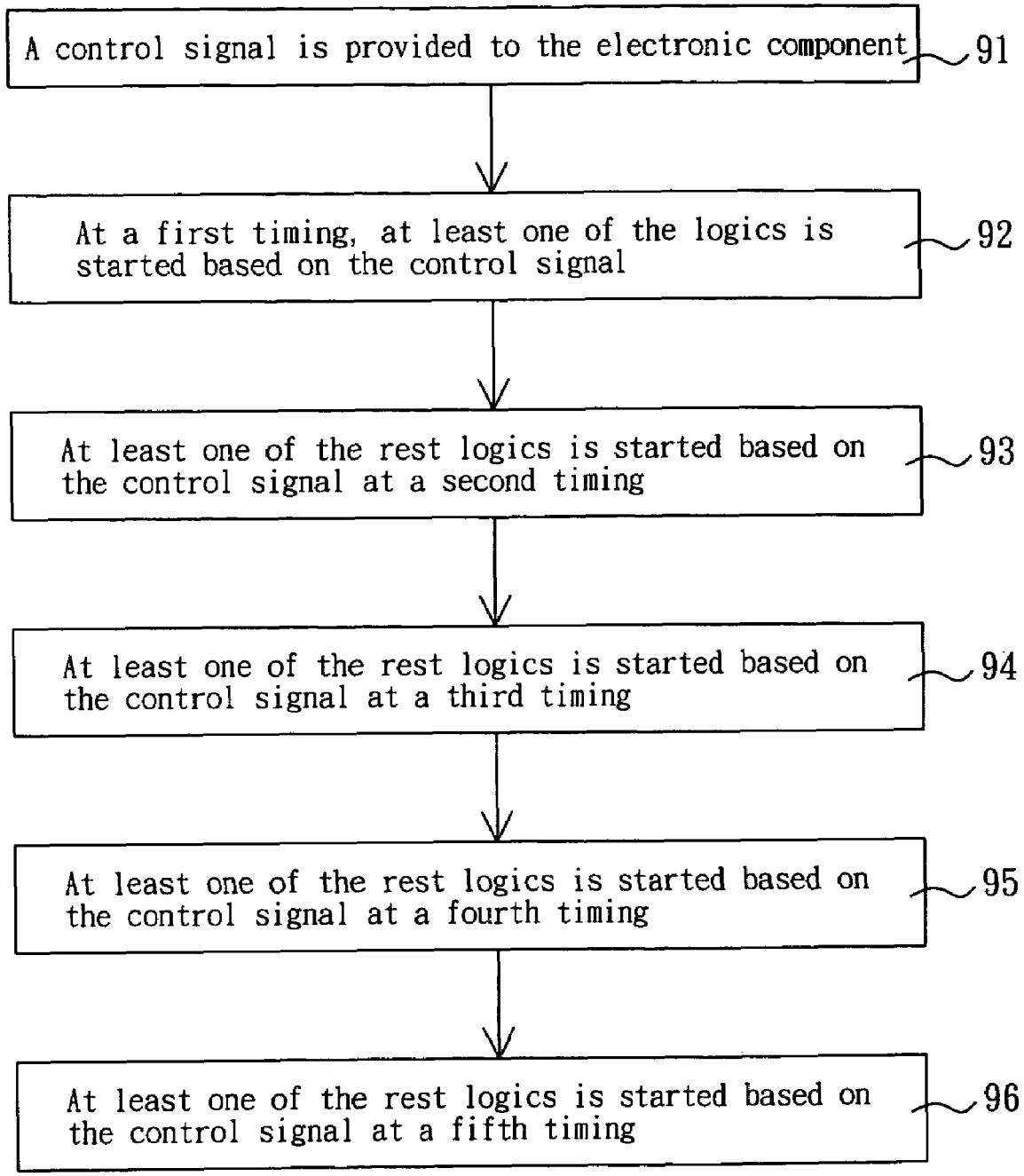
FIG. 6 is a flowchart of a controlling method of logic operations according to an embodiment of the invention.

As shown in FIG. 6 that is a flowchart of a controlling method of logic operations according to an embodiment of the invention, the disclosed controlling method of logic operations can be implemented in the electronic component 20 shown in FIG. 1. With reference to FIGS. 1, 2 and 6, the controlling method of logic operations according to the embodiment of the invention includes the following steps.

Step 91: a control signal is provided to the electronic component, wherein there are several logics 201, 202, 203, 204, 205 inside the electronic component;

Step 92: at a first timing, at least one of the logics is started based on the control signal, wherein the first logic 201 is initiated at time $t_0$ in the preferred embodiment;

Step 93: at least one of the rest logics is started based on the control signal at a second timing, wherein the second logic 202 is initiated at time $t_1$ in the preferred embodiment;

Step 94: at least one of the rest logics is started based on the control signal at a third timing, wherein the third logic 203 is initiated at time $t_2$ in the preferred embodiment;

Step 95: at least one of the rest logics is started based on the control signal at a fourth timing, wherein the fourth logic 204 is initiated at time $t_3$ in the preferred embodiment; and Step 96: at least one of the rest logics is started based on the control signal at a fifth timing, wherein the fifth logic 205 is initiated at time $t_4$ in the preferred embodiment.

As described above, the logics 201~205 inside the electronic component 20 can be started separately to ensure the normal operation of the electronic component. It should be noted that the disclosed controlling method of logic operations can be implemented in the electronic component 20' shown in FIG. 3 or the mainboard 1' shown in FIG. 5.

In summary, the invention uses several control units to let the logics start operating separately at different times. Therefore, the disclosed mainboard, electronic component, and controlling method of logic operations can avoid several logics from starting simultaneously when the chip is in a power peak state. This can lower the noises caused by simultaneously starting several logics and ensure the normal operation of the chip.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A controlling method of logic operations for controlling a plurality of logics inside a chip, wherein the chip is in a power peak state, the controlling method comprising:
   providing a control signal to the chip, wherein the control signal is substantially able to control actions of the logics synchronously;
   controlling at least one of the logics based on the control signal at a first timing; and
   controlling at least another one of the logics based on the control signal at a second timing so as to avoid the logics from starting simultaneously when the chip is in the power peak state.

2. The controlling method of claim 1, wherein the control signal enters at least one control unit so as to use the control unit to control the actions of the logics based on the control signal.

3. The controlling method of claim 2, wherein the control unit comprises a plurality of control circuits.

4. The controlling method of claim 3, wherein each of the control circuits is electrically coupled to at least one of the logics.

5. The controlling method of claim 3, wherein the control circuits are delay circuits.

6. The controlling method of claim 1, wherein the control signal is an enable signal to start the operations of the logics inside the chip.

7. The controlling method of claim 1, wherein the control signal is a disable signal to terminate the operations of the logics inside the chip.

8. An electronic component having different parts to start operating separately, comprising:
   a plurality of logics, which are substantially able to start operations synchronously by a control signal; and
   a control unit electrically coupled to the logics, wherein the control unit controls at least one of the logics based on the control signal at a first timing and at least another one of the logics based on the control signal at a second timing so as to avoid the logics from starting simultaneously when the electronic component is in the power peak state.

9. The electronic component of claim 8, wherein the control unit comprises a plurality of control circuits.

10. The electronic component of claim 9, wherein each of the control circuits is electrically coupled to at least one of the logics.

11. The electronic component of claim 9, wherein the control circuits are delay circuits.

12. The electronic component of claim 8, wherein the control signal is an enable signal to start the operations of the logics.

13. The electronic component of claim 8, wherein the control signal is a disable signal to terminate the operations of the logics.

14. A mainboard, comprising:
   a chip having a plurality of logics, wherein the logics are substantially able to operate synchronously by a control signal; and
   a control unit electrically coupled to the chip, wherein the control unit controls at least one of the logics based on the control signal at a first timing and at least another one of the logics based on the control signal at a second timing so as to avoid the logics from starting simultaneously when the electronic component is in the power peak state.

15. The mainboard of claim 14, wherein the control unit comprises a plurality of control circuits.

16. The mainboard of claim 15, wherein each of the control circuits is electrically coupled to at least one of the logics.

17. The mainboard of claim 15, wherein the control circuits are delay circuits.

18. The mainboard of claim 14, wherein the control signal is an enable signal to start the operations of the logics.

19. The mainboard of claim 14, wherein the control signal is a disable signal to terminate the operations of the logics.

* * * * *